J. Caffrey,
Cage Trap,
N°12,125.    Patented Jan. 2, 1855.
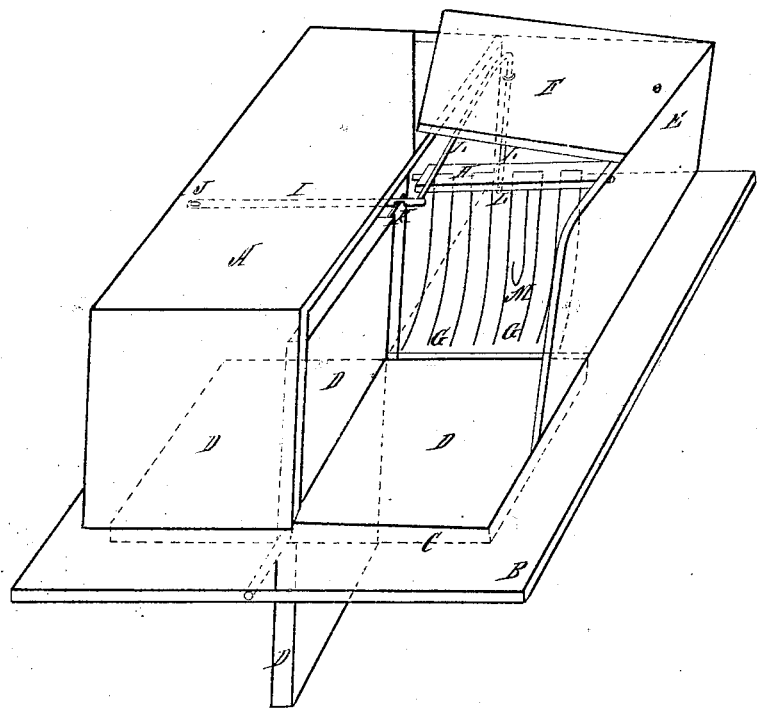

UNITED STATES PATENT OFFICE.

JAMES CAFFREY, OF PARADISE TOWNSHIP, LANCASTER COUNTY, PENNSYLVANIA.

TRAP FOR CATCHING ANIMALS.

Specification of Letters Patent No. 12,125, dated January 2, 1855.

*To all whom it may concern:*

Be it known that I, JAMES CAFFREY, of Paradise township, county of Lancaster, State of Pennsylvania, have invented a new and Improved Self-Acting Animal-Trap; and I do hereby declare that the following is a full and exact description thereof, reference being had to the accompanying drawings, and to the letters of reference marked thereon, making a part of this specification.

The nature of my invention is the arrangement of a lever, spring and wire grating in combination—acting with a revolving platform.

To enable others skilled in the art to make and use my invention I will proceed to describe its construction and operation.

The frame with a flat bottom B having an aperture C in which a revolving platform D, forming four wings, operates, back of platform D is the box E in which the bait is placed such as fowls or any small animals for the purpose of attracting larger animals. The box E has an aperture and lid F at top, and a wire grate G in front; this wire grate G is fastened to a horizontal cross frame H at top, which frame H has journals at each end resting in the sides of the box E so as to allow the grate G to swing backward and forward when an animal approaches the bait and touches or pushes against the grating.

I is a lever extending along the inner side of frame A and works loosely at its back end on a screw bolt J. The front end of lever I has a notch which rests upon a pin K projecting from the one corner of each platform or wing D. A wire spring L is fastened to the front end of lever I and extends in a right angle with the lever I across the top of frame H and box E immediately under the lid F and down the back part of box E to the bottom of the box E where it is firmly fastened. This spring L is also fastened against the back part of box E by small staples.

When the animal walks on to the platform D and pushes against the grating G the back edge of frame H raises the spring L which lifts the lever I which frees the pin K (which was held by the notch in the lever I) and the platform D falls downward with the weight of the animal, and the animal is entrapped in a box or hole underneath; at the same time the pin K on the next wing or platform D is caught by the notch in the lever I and the trap is again set, thus, selfacting. A hook M, for bait, is also attached to the frame H to attract and catch the smaller animals.

I do not claim a revolving platform but—

What I claim as my invention and desire to secure by Letters Patent is—

The peculiar arrangement and combination of the lever I spring L and wire grating G, acting simultaneously with the revolving platform D to cause the trap to act and set itself, substantially as herein described.

JAMES CAFFREY.

Witnesses present:
I, FRANKLIN REIGART,
J. FRANK REIGART,